(12) United States Patent
Nishimori

(10) Patent No.: US 12,736,632 B2
(45) Date of Patent: Sep. 15, 2026

(54) DISTANCE MEASUREMENT DEVICE AND DISTANCE MEASUREMENT METHOD

(71) Applicant: SONY SEMICONDUCTOR SOLUTIONS CORPORATION, Kanagawa (JP)

(72) Inventor: Hiroaki Nishimori, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 989 days.

(21) Appl. No.: 17/904,228

(22) PCT Filed: Jan. 19, 2021

(86) PCT No.: PCT/JP2021/001707
§ 371 (c)(1),
(2) Date: Mar. 13, 2023

(87) PCT Pub. No.: WO2021/166523
PCT Pub. Date: Aug. 26, 2021

(65) Prior Publication Data

US 2023/0204727 A1 Jun. 29, 2023

(30) Foreign Application Priority Data

Feb. 21, 2020 (JP) ................................ 2020-027950

(51) Int. Cl.
*G01S 7/481* (2006.01)
*G01S 7/4865* (2020.01)
(Continued)

(52) U.S. Cl.
CPC .......... *G01S 7/4816* (2013.01); *G01S 7/4865* (2013.01); *G01S 17/10* (2013.01); *G01S 17/50* (2013.01); *G01S 7/4814* (2013.01)

(58) Field of Classification Search
CPC ...... G01S 7/4816; G01S 7/4865; G01S 17/10; G01S 17/50; G01S 7/4814; G01S 7/4815;
(Continued)

(56) References Cited

U.S. PATENT DOCUMENTS 11,428,520 B2 * 8/2022 Okuma .................. G01B 11/14
2019/0361126 A1 * 11/2019 Abari .................. H04N 23/698
(Continued)

FOREIGN PATENT DOCUMENTS

JP 07-167958 A 7/1995
JP 09-243729 A 9/1997
(Continued)

OTHER PUBLICATIONS

Klein et al. (doc. “Tracking objects outside the line of sight using 2D intensity images”) (Year: 2016).*
English Translation Description WO2020026615A1.*
International Search Report and Written Opinion of PCT Application No. PCT/JP2021/001707, issued on Mar. 30, 2021, 11 pages of ISRWO.

*Primary Examiner* — Assres H Woldemaryam
(74) *Attorney, Agent, or Firm* — CHIP LAW GROUP

(57) ABSTRACT

An object of the present invention is to sufficiently consider safety of human eyes in distance measurement. The present technology relates to a distance measurement device including: an irradiation unit configured to emit light to a target space; a light receiving unit configured to receive observation light in the target space and including a plurality of light receiving elements that outputs an electric signal; a light intensity calculation unit configured to calculate light intensity in the target space, on the basis of a first electric signal corresponding to reflected light from an object irradiated with first light included in the observation light received by the light receiving unit, the first light being emitted from the irradiation unit; and a distance measurement processing unit configured to perform a distance measurement process for calculating a distance to the object, on the basis of a second
(Continued)

electric signal corresponding to reflected light from the object irradiated with second light included in the observation light received by the light receiving unit, the second light being emitted from the irradiation unit on the basis of the light intensity calculated by the light intensity calculation unit.

17 Claims, 11 Drawing Sheets

(51) Int. Cl.
*G01S 17/10* (2020.01)
*G01S 17/50* (2006.01)

(58) Field of Classification Search
CPC ...... G01S 7/4868; G01S 17/26; G01S 17/894; G01S 7/484; G01C 3/06
See application file for complete search history.

(56) References Cited

U.S. PATENT DOCUMENTS

| | | | | |
|---|---|---|---|---|
| 2019/0377073 | A1* | 12/2019 | Takahashi | G01S 17/36 |
| 2020/0300987 | A1* | 9/2020 | Ta | G01S 7/4865 |
| 2021/0010803 | A1* | 1/2021 | Okuma | G01C 3/06 |
| 2021/0063576 | A1* | 3/2021 | Gupta | G06T 7/521 |
| 2021/0072379 | A1* | 3/2021 | Christmas | G01S 7/4863 |

FOREIGN PATENT DOCUMENTS

| | | | | |
|---|---|---|---|---|
| JP | 2008-241435 | A | 10/2008 | |
| JP | 2013-190273 | A | 9/2013 | |
| JP | 2015-152574 | A | 8/2015 | |
| JP | 2020-160044 | A | 10/2020 | |
| WO | WO-2020026615 | A1 * | 2/2020 | H04N 23/74 |

* cited by examiner

FIG. 1

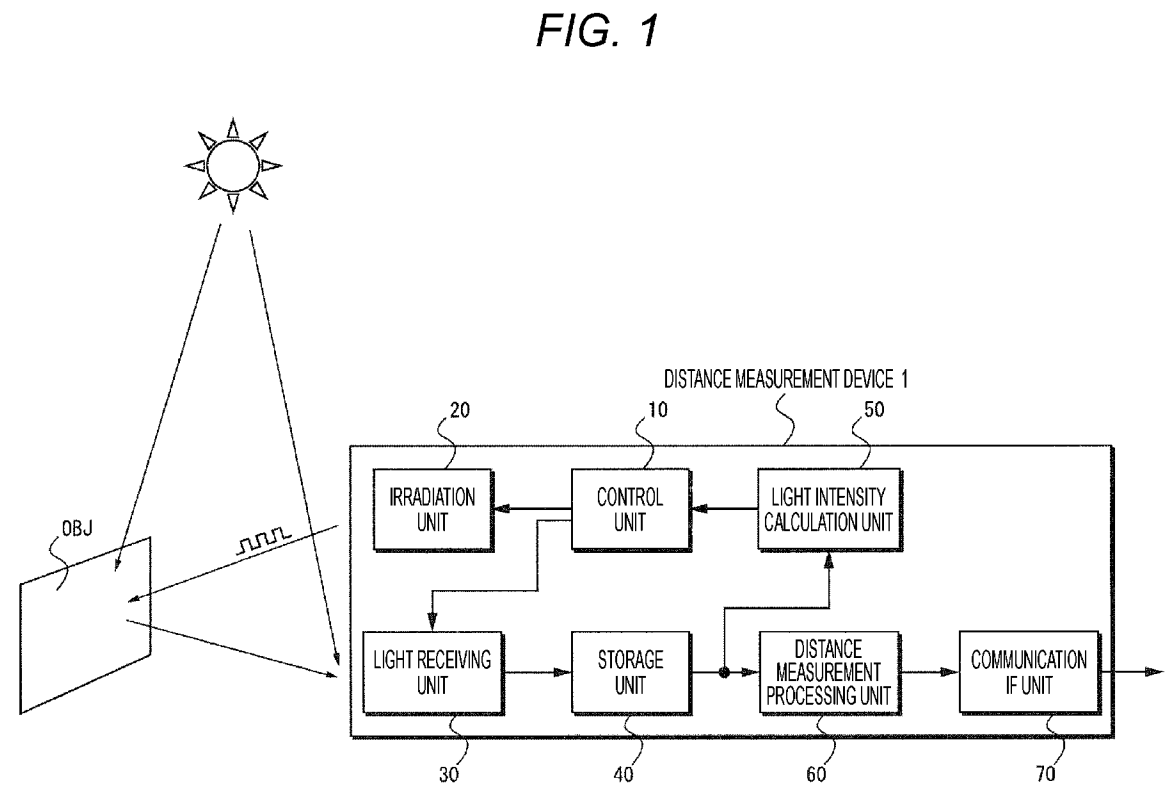

DISTANCE MEASUREMENT DEVICE 1

20 IRRADIATION UNIT

10 CONTROL UNIT

50 LIGHT INTENSITY CALCULATION UNIT

30 LIGHT RECEIVING UNIT

40 STORAGE UNIT

60 DISTANCE MEASUREMENT PROCESSING UNIT

70 COMMUNICATION IF UNIT

OBJ

FIG. 6
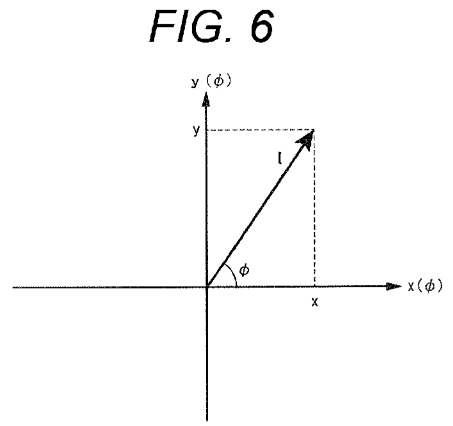
FIG. 7
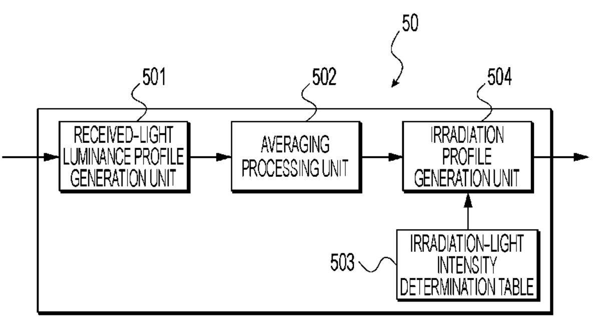
FIG. 8
IRRADIATION-LIGHT INTENSITY DETERMINATION TABLE
| AVERAGE LUMINANCE VALUE | IRRADIATION-LIGHT INTENSITY |
|---|---|
| 0-10 | 0 |
| 11-63 | 3 |
| 64-127 | 2 |
| 128-255 | 1 |

Figure 11:
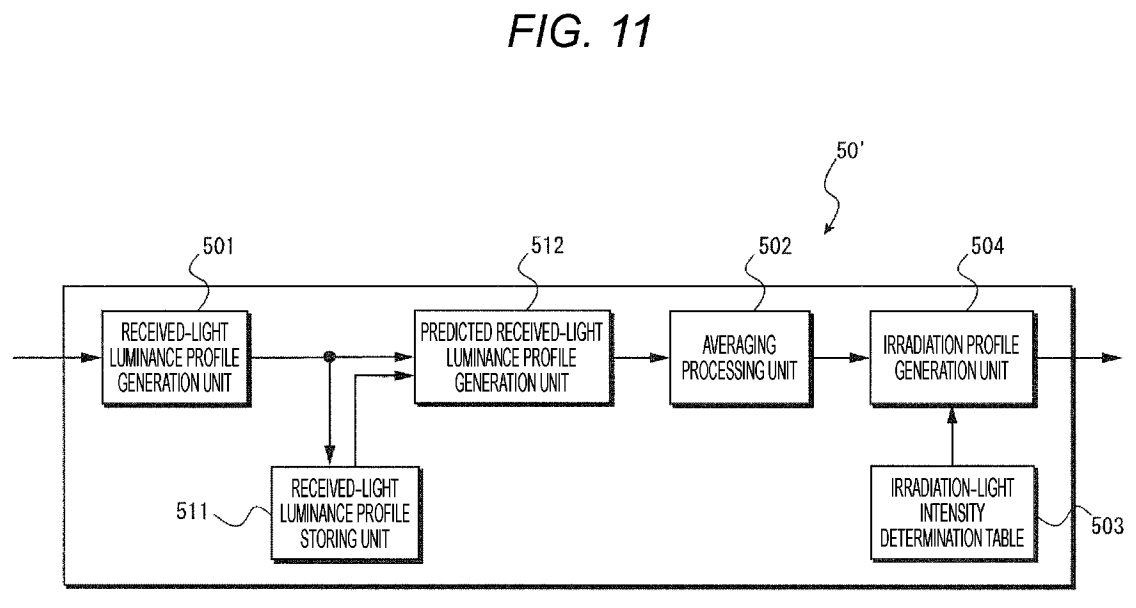

501 RECEIVED-LIGHT LUMINANCE PROFILE GENERATION UNIT

511 RECEIVED-LIGHT LUMINANCE PROFILE STORING UNIT

512 PREDICTED RECEIVED-LIGHT LUMINANCE PROFILE GENERATION UNIT

502 AVERAGING PROCESSING UNIT

504 IRRADIATION PROFILE GENERATION UNIT

503 IRRADIATION-LIGHT INTENSITY DETERMINATION TABLE

RECEIVED-LIGHT LUMINANCE PROFILE
OBJ
PREDICTION

OBJ
PREDICTION

OBJ

IRRADIATION PROFILE
0
3
1

0
3
1

0
3
1

DISTANCE MEASUREMENT DEVICE AND DISTANCE MEASUREMENT METHOD

CROSS REFERENCE TO RELATED APPLICATIONS

This application is a U.S. National Phase of International Patent Application No. PCT/JP2021/001707 filed on Jan. 19, 2021, which claims priority benefit of Japanese Patent Application No. JP 2020-027950 filed in the Japan Patent Office on Feb. 21, 2020. Each of the above-referenced applications is hereby incorporated herein by reference in its entirety.

TECHNICAL FIELD

The present technology relates to a distance measurement device and a distance measurement method.

BACKGROUND ART

A distance measurement device (may also be referred to as a distance measuring sensor) that measures a distance to an object (target object) on the basis of time of flight (ToF) is known. The ToF generally includes direct ToF (dToF) and indirect ToF (iToF). The direct ToF is a technology in which pulsed light is emitted from a light emitting element, reflected light from an object irradiated with the pulsed light is received by a light receiving element called a single photon avalanche diode (SPAD) to detect photons, carriers generated in this operation are converted into electric signal pulses using avalanche multiplication, the electric signal pulses are input to a time to digital converter (TDC) to measure arrival time of the reflected light, and a distance to the object is calculated. On the other hand, the indirect ToF emits pulsed light from a light emitting element, detects a charge generated by receiving reflected light from an object irradiated with the pulsed light by a light receiving element, and measures a flight time of light using a semiconductor element structure in which an accumulation amount thereof changes depending on the arrival timing of light.

In the distance measurement device using the ToF as described above, irradiation light having uniform light intensity is generally used as irradiation light applied toward the target space. On the other hand, in the target space, there may be objects that are in relatively short and long distances, and thus a technology of changing light intensity for each position on an image on the basis of reflected light from the object has been proposed.

Patent Literature 1 below discloses a device that generates pulsed light in a plurality of angular directions from a light transmission device, receives reflected light from an object by a light reception device, detects a distance to the object from a time difference between transmission and reception of the transmitted light and the reflected light, and individually controls power of the transmitted light for every angular direction such that reception intensity of the reflected light for each angular direction falls within a predetermined range.

Furthermore, Patent Document 2 below discloses a technique for generating a distance image with higher accuracy by changing the light amount of a light emitting source. Specifically, Patent Document 2 discloses a device including: an imaging element including a light emitting source that irradiates modulated light to a target space, a plurality of photoelectric conversion elements that receives reflected light irradiated from the light emitting source and reflected by a target object in the target space and converts the reflected light into charges, a plurality of charge accumulation units provided for every photoelectric conversion element, and a unit that distributes the charges converted by the photoelectric conversion elements to the plurality of charge accumulation units in synchronization with modulation of the light emitting source; a distance image generation unit that performs predetermined calculation on the basis of the charges stored in the plurality of charge accumulation units and generates a distance image whose pixel value is a distance value; and a light amount adjustment unit that adjusts the light amount of the light emitting source. Patent Literature 2 also discloses a device in which a light emitting source includes a plurality of light emitters that irradiates a target space with modulated light, the plurality of light emitters is divided into a plurality of regions, while a plurality of photoelectric conversion elements is divided into a plurality of photoelectric conversion element areas corresponding to the plurality of regions, and a light amount adjusting unit adjusts a light amount for every light emitter in the region.

CITATION LIST

Patent Document

Patent Document 1: Japanese Patent Application Laid-Open No. 7-167958

Patent Literature 2: Japanese Patent Application Laid-Open No. 2008-241435

SUMMARY OF THE INVENTION

Problems to be Solved by the Invention

In the techniques disclosed in the documents described above, although the intensity or amount of light to be irradiated is adjusted according to the distance to the target object, the light intensity is adjusted using reflected light dependent on the light (distance measurement light) irradiated for distance measurement. Therefore, even if the light intensity is weakened to some extent at the time of irradiation with the distance measuring light, it cannot be said that eye safety may always be sufficient in a case where a wavelength harmful to human eyes is included, for example. On the other hand, in a case where eye safety is prioritized, there is a problem that sufficient light intensity cannot be obtained for distance measurement therearound, and distance measurement cannot be accurately performed. Furthermore, in order to adjust the light intensity by receiving the irradiation of the distance measurement light, it is necessary to irradiate the distance measurement light having a certain light intensity in advance. Therefore, the distance measurement light having light intensity before adjustment might be irradiated to the human eyes.

Therefore, an object of the present technology is to provide a distance measurement device and a distance measurement method that sufficiently consider safety of human eyes.

Solutions to Problems

The present technology for solving the problems described above includes the following technology specifying matters or technical features.

The present technology according to a certain aspect is a distance measurement device, including: an irradiation unit configured to emit light to a target space; a light receiving unit configured to receive observation light in the target space and including a plurality of light receiving elements that outputs an electric signal; a light intensity calculation unit configured to calculate light intensity in the target space, on the basis of a first electric signal corresponding to reflected light from an object irradiated with first light included in the observation light received by the light receiving unit, the first light being emitted from the irradiation unit; and a distance measurement processing unit configured to perform a distance measurement process for calculating a distance to the object, on the basis of a second electric signal corresponding to reflected light from the object irradiated with second light included in the observation light received by the light receiving unit, the second light being emitted from the irradiation unit on the basis of the light intensity calculated by the light intensity calculation unit.

Furthermore, the present technology according to another aspect is a distance measurement method, including: emitting light from an irradiation unit to a target space; receiving observation light of the target space and outputting an electric signal by a light receiving unit; calculating light intensity in the target space on the basis of a first electric signal corresponding to reflected light from an object irradiated with first light included in observation light received by the light receiving unit, the first light being emitted from the irradiation unit; and performing a distance measurement process for calculating a distance to the object, on the basis of a second electric signal corresponding to reflected light from the object irradiated with second light included in observation light received by the light receiving unit, the second light being emitted from the irradiation unit on the basis of the calculated light intensity.

Note that, in the present specification and the like, means does not simply represent physical means, and includes a case where a function of the means is realized by software. Furthermore, the function of one means may be realized by two or more physical means, or the function of two or more means may be realized by one physical means.

In addition, the "system" refers to a logical assembly of a plurality of devices (or functional modules that implement specific functions), regardless of whether or not each device or each functional module is in a single housing.

Other technical features, objects, effects, or advantages of the present technology will be clarified by the following embodiments described with reference to the accompanying drawings.

Furthermore, the effects described in the present specification are merely examples and are not limited, and other effects may be provided.

BRIEF DESCRIPTION OF DRAWINGS

FIG. 1 is a block diagram illustrating an example of a configuration of a distance measurement device according to an embodiment of the present technology.

FIG. 6 is a graph illustrating an example of a method of calculating light intensity using multiphase pulsed light by the distance measurement device according to an embodiment of the present technology.

FIG. 7 is a block diagram illustrating an example of a configuration of a light intensity calculation unit of the distance measurement device according to an embodiment of the present technology.

FIG. 8 is a diagram for describing an example of an irradiation-light intensity determination table of the distance measurement device according to an embodiment of the present technology.

FIG. 11 is a block diagram illustrating an example of another configuration of the light intensity calculation unit of the distance measurement device according to an embodiment of the present technology.

MODE FOR CARRYING OUT THE INVENTION

Figure 2A:
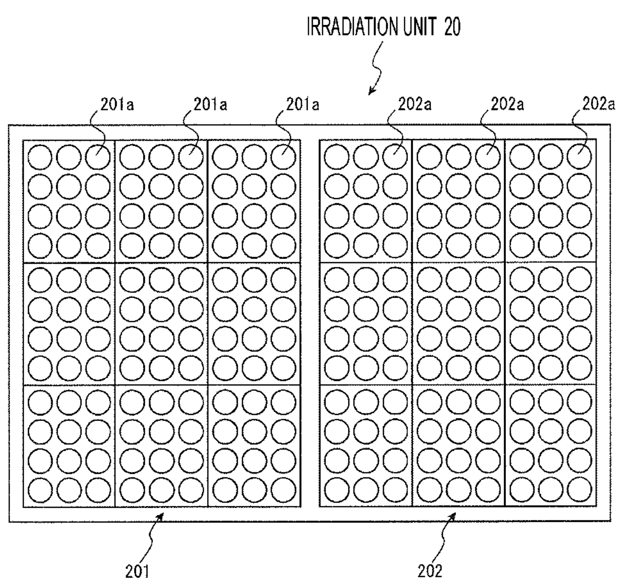
FIG. 2A is a diagram illustrating an example of a configuration of an irradiation unit of the distance measurement device according to an embodiment of the present technology.

Hereinafter, an embodiment of the present technology will be described with reference to the drawings. Note that the embodiment described below is merely an example, and is not intended to exclude various modifications and applications of techniques that are not explicitly described below. The present technology can be implemented by making various modifications (for example, combining each embodiment and the like) without departing from the gist of the present technology. Furthermore, in the following description of the drawings, the same or similar parts are denoted by the same or similar reference numerals. The drawings are schematic and do not necessarily match actual dimensions, ratios, and the like. The drawings may include portions having different dimensional relationships and ratios.

First Embodiment

FIG. 1 is a block diagram illustrating an example of a configuration of a distance measurement device according to an embodiment of the present technology. The distance measurement device 1 is a so-called indirect ToF type distance measurement sensor that emits modulated pulsed light from a light source to a target space and measures a distance to an object (target object or subject) OBJ in the target space on the basis of an electric signal obtained by receiving, by a light receiving element, reflected light from the object OBJ irradiated with the pulsed light. In the present disclosure, although an indirect ToF type distance measurement sensor is described as an example, the technology according to the present disclosure can be similarly applied to various sensors using a direct ToF type distance measurement sensor, a light cutting method, and the like.

As illustrated in the drawing, the distance measurement device 1 includes components such as a control unit 10, an irradiation unit 20, a light receiving unit 30, a storage unit 40, a distance measurement processing unit 60, a communication IF unit 70, and a light intensity calculation unit 50, for example. These components can be integrally configured as a system on a chip (SoC) such as a CMOS LSI, for example. Alternatively, some components such as the irradiation unit 20 and the light receiving unit 30 may be configured as separate LSIs, for example.

The control unit 10 is a component that integrally controls the operation of the distance measurement device 1. Although not illustrated, the control unit 10 may include a control signal generation unit that generates and outputs a control signal for driving and controlling the irradiation unit 20 and the light receiving unit 30 according to the generated clock. Furthermore, in the present disclosure, the control unit 10 controls an emission mode of the irradiation unit 20. The emission mode includes, for example, a profile generation mode in which first light having a first wavelength for generating a received-light luminance profile indicating light intensity for every region of the target space is emitted, and a distance measurement mode in which second light having a second wavelength for measuring the distance to the target object OBJ is emitted.

The irradiation unit 20 is a component including the light source that emits modulated pulsed light for ToF distance measurement to the target space. The light source may be, for example, a surface irradiation type laser including a plurality of light emitting elements arranged in a two-dimensional array. According to the present disclosure, the irradiation unit 20 includes a first light source 201 that emits first light having a first wavelength and a second light source 202 that emits second light having a second wavelength so as to be able to emit light having at least two types of wavelengths corresponding to the above-described emission mode. The first light is, for example, near-infrared light having a wavelength of 800 to 2500 nm. Under the control of the control unit 10, in the profile generation mode, the irradiation unit 20 emits first light having uniform spatial light intensity from the first light source 201 to the target space. Furthermore, under the control of the control unit 10, in the distance measurement mode subsequent to the profile generation mode, the irradiation unit 20 emits second light having a spatial light intensity according to an irradiation profile, described later, from the second light source 202 to the target space. The second light source 202 is driven at a high speed, for example, at a frequency of 10 to 200 MHz, has a pulse width of several to several tens of ns, and emits pulsed light (multiphase pulsed light) having different phases. As will be described later, the irradiation profile indicating the spatial light intensity for each region of the target space is generated by the light intensity calculation unit 50 according to the observation light including the reflected light from the target object OBJ by the first light. As another example, the second light source 202 of the irradiation unit 20 is configured to emit spot-shaped second light from the second light source 202 according to the generated irradiation profile. In other words, in the distance measurement mode, the control unit 10 performs control such that only a part of the second light emitting elements 202*a* in the irradiation unit 20 irradiates the second light and the other second light emitting elements 202*a* do not irradiate the second light so that the distance can be measured only in a specific region of the target space. With this arrangement, the irradiation unit 20 irradiates the specific region as a spot, for example. In the present disclosure, the surface irradiation type laser is described as an example, but the irradiation unit 20 may be configured to realize surface emission by a line irradiation type laser or a spot irradiation laser and a scanning mirror.

The light receiving unit 30 is a sensor that responds to light (observation light) incident from the target space, accumulates electric charges under the control of the control unit 10, and outputs an electric signal corresponding thereto. Although not illustrated, typically, a light receiving optical system which is a condenser lens and the like is provided in front of the light receiving surface of the light receiving unit 30 so that light can be efficiently received. The light receiving unit 30 is typically a CMOS image sensor including a plurality of light receiving elements arranged in a two-dimensional array, but is not limited thereto, and may be, for example, a CCD image sensor. For example, under the control of the control unit 10, the specific light receiving element group of the light receiving unit 30 operates at a predetermined light receiving timing synchronized with a predetermined irradiation timing in either the profile generation mode or the distance measurement mode, and accumulates the charge according to the received observation light. For example, the specific light receiving element group of the light receiving unit 30 is applied with a voltage modulated to the same frequency (10 to 200 MHz) as the above-described pulse driving frequency (10 to 200 MHz) and driven. With this arrangement, the irradiation timing of the irradiation light is matched with the accumulation timing of the light receiving element group. In this example, as described later, the light receiving unit 30 performs charge accumulation and outputs (reads) four times corresponding to, for example, four times of emission of pulsed light. The charge (electric signal) read from the light receiving unit 30 is transferred to the storage unit 40.

The storage unit 40 is a memory that temporarily holds pixel data based on the electric signal read from the light receiving unit 30. The storage unit 40 may be a volatile memory or a non-volatile memory. In this example, the storage unit 40 is configured to store image data for one image frame read from the light receiving unit 30, but the present invention is not limited thereto. As an alternative example, the storage unit 40 can store image data based on observation light corresponding to irradiation of several lines of pulsed light by the irradiation unit 20. The image data held in the storage unit 40 is referred to and processed by the light intensity calculation unit 50 and the distance measurement processing unit 60.

In the profile generation mode, the light intensity calculation unit 50 calculates the light intensity in the target space on the basis of the first pixel data read from the storage unit 40, and generates the irradiation profile from the received-light luminance profile based on the light intensity. The first pixel data is data obtained on the basis of the first light by the first light source 201. The light intensity may be, for example, luminance, brightness, or illuminance, but in the present disclosure, the luminance will be described as an example. The received-light luminance profile and the irradiation profile are, for example, data-sets indicating the light intensity for each predetermined region obtained by dividing the image frame corresponding to the target space. The irradiation profile may be, for example, an inverted profile of the received-light luminance profile. The predetermined region is a region obtained by dividing the image frame into 16, 24, 32 pieces, etc. but is not limited thereto. For example, one or four pixels (light receiving elements) may be set as one region. The light intensity is indicated by a value of 0 to 255, for example. Note that, as will be described later, the light intensity calculation unit 50 can calculate the spatial light intensity in the irradiation profile such that, for example, a region having a higher light intensity in the received-light luminance profile has a lower light intensity of the irradiation light in a case where the irradiation is performed in the distance measurement mode. In addition, the light intensity calculation unit 50 can calculate the spatial light intensity in the irradiation profile such that a region having a lower light intensity in the received-light luminance profile has a higher light intensity of the irradiation light in a case where the irradiation is performed in the distance measurement mode. The light intensity calculation unit 50 transmits data regarding the calculated light intensity to the control signal generation unit.

The distance measurement processing unit 60 is a component that calculates the distance (measures the distance) to the object OBJ on the basis of the pulsed light emitted by the irradiation unit 20 and the observation light received by the light receiving unit 30 in the distance measurement mode. The distance measurement processing unit 60 is typically configured by a signal processing processor. In the present disclosure, the distance measurement processing unit 60 is configured to calculate the distance on the basis of the charge received and accumulated for each phase by the light receiving unit 30 in correspondence with the pulsed light (multi-phase pulsed light) having different phases emitted by the irradiation unit 20. The distance measurement processing unit 60 transmits, to the communication IF unit 70, data regarding the distance to the object calculated in the distance measurement processing.

The communication IF unit 70 transmits the information indicating the distance calculated by the distance measurement processing unit 60 to an external device such as a host device.

Figure 2B:
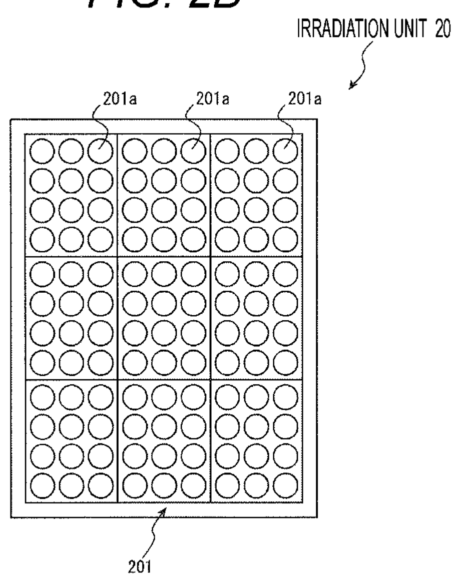
FIG. 2B is a diagram illustrating an example of a configuration of the irradiation unit of the distance measurement device according to an embodiment of the present technology.

FIGS. 2A and 2B are diagrams illustrating an example of a configuration of the irradiation unit according to an embodiment of the present technology. As described above, the irradiation unit 20 includes the first light source 201 that emits first light having a first wavelength and the second light source 202 that emits second light having a second wavelength. As illustrated in FIG. 2A, the first light source 201 may include a plurality of first light emitting elements 201*a* arranged in a two-dimensional array. The second light source 202 may include a plurality of second light emitting elements 202*a* arranged in a two-dimensional array. As described later, the first light source 201 emits light having smaller light energy than the second light source 202. By performing irradiation using such first light source 201, safety for human eyes can be secured. The first light is, for example, near-infrared light in the range of about 800 to 2500 nm in wavelength, while the second light is near-infrared light in the range of about 800 to 1000 nm. In the present disclosure, it is assumed that the wavelength of the first light is about 1000 nm, while the wavelength of the second light is about 940 nm.

Furthermore, as described later, for example, as illustrated in FIG. 2B, the irradiation unit 20 may include only the first light source 201. As illustrated in the same drawing, the first light source 201 may include a plurality of first light emitting elements 201*a* arranged in a two-dimensional array. At this time, the irradiation unit 20 emits light from the first light source 201 in both emission modes of a profile generation mode for generating a received-light luminance profile indicating the light intensity for each region of the target space and a distance measurement mode for measuring the distance to the target object OBJ.

Figure 3:
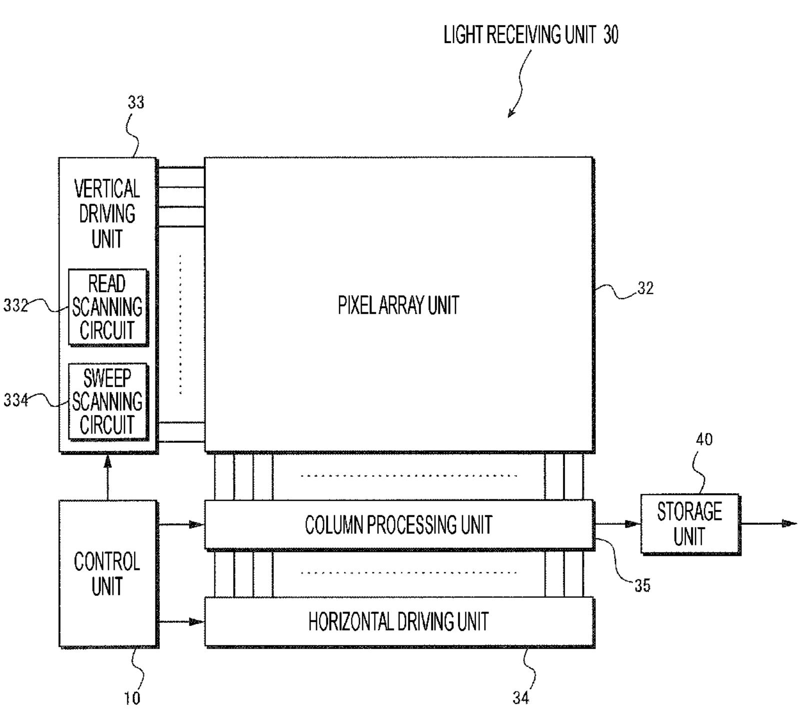
FIG. 3 is a diagram illustrating an example of a configuration of a light receiving unit of the distance measurement device according to an embodiment of the present technology.

FIG. 3 is a diagram illustrating an example of a configuration of the light receiving unit according to an embodiment of the present technology. As illustrated in the same drawing, the light receiving unit 30 includes, for example, a pixel array unit 32, a vertical driving unit 33, a horizontal driving unit 34, and a column processing unit 35. The light receiving unit 30 is driven under the control of the control unit 10 (see FIG. 1).

The pixel array unit 32 includes photoelectric conversion element groups arranged in an array, which generate and store charges according to the intensity of incident light. The embedded photodiode is an aspect of a photoelectric conversion element. Each or some of the plurality of photoelectric conversion elements may constitute one pixel. In the same drawing, an up-and-down direction of the pixel array unit 32 is defined as a column direction or a vertical direction, and a right-and-left direction is defined as a row direction or a horizontal direction.

The vertical driving unit 33 includes a shift register, an address decoder (not illustrated), and the like. Under the control of the control unit 10, the vertical driving unit 33 drives, for example, the pixel groups of the pixel array unit 32 in the vertical direction in order in units of rows. In the present disclosure, the vertical driving unit 33 may include a read scanning circuit 332 that performs scanning for reading a signal and a sweep scanning circuit 334 that performs scanning to sweep (reset) unnecessary charges from the photoelectric conversion element.

In order to read a signal based on electric charges from each pixel, the read scanning circuit 332 sequentially performs selective scanning of pixel groups of the pixel array unit 32 in units of rows.

The sweep scanning circuit 334 performs sweep scanning on the read row on which the read operation is performed by the read scanning circuit 332 prior to the read operation by the time corresponding to the operation speed of the electronic shutter. By sweeping (resetting) unnecessary charges by the sweep scanning circuit 334, a so-called electronic shutter operation is performed. The electronic shutter operation refers to an operation of sweeping out charges of the photoelectric conversion element and newly starting exposure (accumulation of charges).

The signal based on the charge read by the read operation by the read scanning circuit 332 corresponds to the magnitude of the light energy incident after the immediately preceding read operation or electronic shutter operation. Then, the period from the read timing by the immediately preceding read operation or the sweep operation timing by the electronic shutter operation to the read timing by the current read operation is the charge accumulation time in the pixel.

The horizontal driving unit 34 includes a shift register, an address decoder (not illustrated), and the like. Under the control of the control unit 10, the horizontal driving unit 34 drives, for example, the pixel groups of the pixel array unit 32 in the horizontal direction in order in units of columns. A signal based on the charge accumulated in the selected pixel is output to the column processing unit 35 by selective driving of the pixel by the vertical driving unit 33 and the horizontal driving unit 34.

The column processing unit 35 performs, for example, certain processing such as correlated double sampling (CDS) on a signal output from each of the pixel groups in the selected row of the pixel array unit 32. Specifically, the column processing unit 35 receives a difference signal output from each of the pixel groups in the selected row, and obtains a level (potential) difference indicated by the difference signal to acquire a signal for every pixel of one row. Furthermore, the column processing unit 35 can remove fixed pattern noise from the acquired signal. The column processing unit 35 converts the signal subjected to such predetermined processing into a digital signal by an A/D conversion unit (not illustrated), and outputs the digital signal as pixel data. The pixel data is temporarily stored in the storage unit 40 and is to be referred to.

Figure 4:
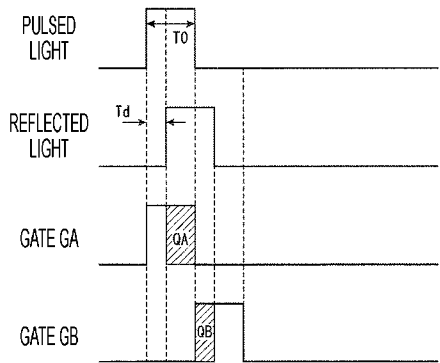
FIG. 4 is a diagram illustrating an example of a timing chart for describing the operation principle of the light receiving unit in the distance measurement device according to an embodiment of the present technology.

FIG. 4 is a diagram illustrating an example of a timing chart for describing the operation principle of the light receiving unit in the distance measurement device according to an embodiment of the present technology. That is, as illustrated in the drawing, the object OBJ is irradiated with the pulsed light having the pulse width T emitted by the irradiation unit 20, and is observed as reflected light in the light receiving unit 30 after the delay time Td.

Each light receiving element has a pair of gates, alternately opens the gates by alternately applying a pulse signal to each of the pair of gates, and transfers the charges QA and QB generated in the light receiving element to each charge accumulation unit (not illustrated). The charges QA and QB accumulated in each charge accumulation unit of each light receiving element are converted into voltage change amounts and read out to the outside as electric signals.

In the light receiving unit 30 configured as described above, under the control of the control unit 10, the light receiving element groups of a plurality of rows are sequentially validated by the cooperative operation of the vertical driving unit 33 and the horizontal driving unit 34 according to the control signal from the control signal generation unit, and the accumulated charge is read out as an electric signal (pixel data) from the light receiving element group and output to the storage unit 40. In the present disclosure, the electric signal based on the accumulated charges is used for calculation of light intensity (for example, a luminance value) by the light intensity calculation unit 50 in the profile generation mode, and is used for calculation of a distance by the distance measurement processing unit 60 in the distance measurement mode.

Figure 5:
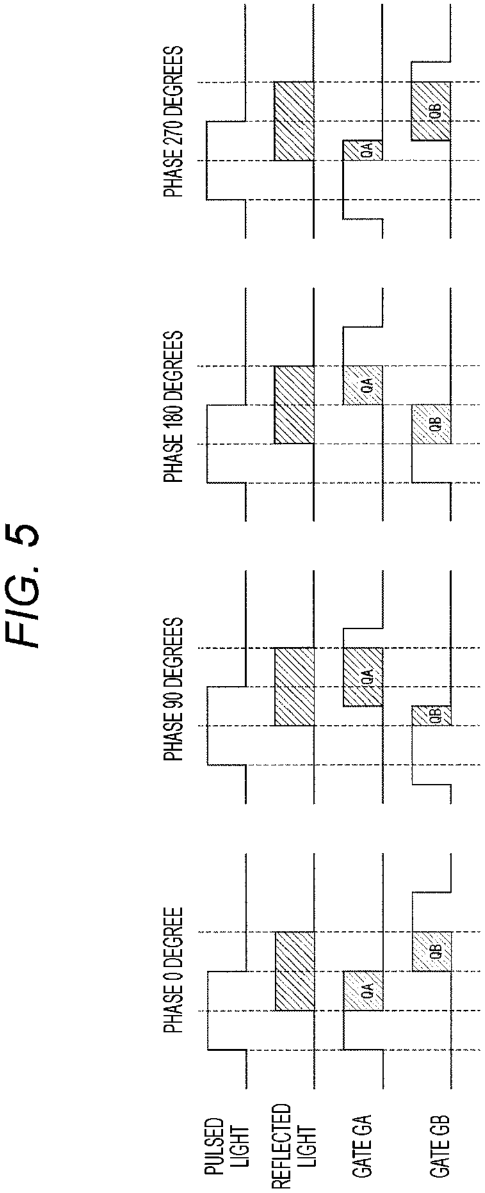
FIG. 5 is a diagram illustrating an example of a timing chart for describing an operation principle of a light receiving unit using a multiphase pulse in the distance measurement device according to an embodiment of the present technology.

Furthermore, in the present disclosure, as described above, the distance measurement device 1 performs charge accumulation and charge readout four times corresponding to four pulsed lights. FIG. 5 is a diagram illustrating an example of a timing chart for describing an operation principle of a light receiving unit by a multiphase pulse in the distance measurement device according to an embodiment of the present technology. That is, under the control of the control unit 10, the irradiation unit 20 emits pulsed light (multiphase pulsed light) having different phases such as 0 degrees, 90 degrees, 180 degrees, and 270 degrees to the target space as illustrated in the drawing. Under the control of the control unit 10, the light receiving unit 30 collects the reflected light with respect to the pulsed light emitted with the phase shifted in this manner, and accumulates the charge according to the amount of received light for each phase. Note that the irradiation unit 20 emits multiphase pulsed light having uniform spatial light intensity (first irradiation profile) from the first light source 201 as first light in the profile generation mode, and emits multiphase pulsed light having spatial light intensity according to the irradiation profile (second irradiation profile) generated by the irradiation profile generation unit 504 as second light from the second light source 202 in the distance measurement mode.

In the profile generation mode, the intensity of the light received using the multiphase pulsed light is calculated using the accumulated charge amount based on the observation light in each phase in the light receiving unit 30. That is, in a case where a difference between the phase of the pulsed light emitted from the first light source 201 of the irradiation unit 20 and the phase of the observation light corresponding to the pulsed light received by the light receiving unit 30 is assumed as a phase difference φ, the component x and the component y of the light intensity satisfy the following relationship.

$$x(\varphi)=(Q0-Q180)/2 \quad \text{Expression 1}$$

$$y(\varphi)=(Q90-Q270)/2 \quad \text{Expression 2}$$

Here, Q0, Q90, Q270, and Q180 are the accumulated charge amounts (Q=QA−QB) in each phase.

Therefore, as illustrated in FIG. 6, the light intensity (luminance value) I is expressed as follows.

$$I=\sqrt{(x(\varphi)^2+y(\varphi)^2)} \quad \text{Expression 3}$$

The closeness or distantness of the distance from the light source to the target object OBJ and the magnitude of the reflectance of the target object OBJ are related to the magnitude of the charge accumulation amount in the light receiving unit 30, and thus can be expressed as light intensity.

On the other hand, in the distance measurement mode, the distance D is calculated using the phase difference φ between the phase of the pulsed light emitted from the second light source 202 of the irradiation unit 20 and the phase of the observation light corresponding to the pulsed light received by the light receiving unit 30. That is, the distance D from the light source of the irradiation unit 20 to the object OBJ is expressed as follows.

$$D=(1/2)\times c\times\Delta t \quad \text{Expression 4}$$

Here, c is the speed of light.

Furthermore, Δt is calculated as follows, where the difference between the phase of the pulsed light emitted from the second light source 202 of the irradiation unit 20 and the phase of the observation light corresponding to the pulsed light received by the light receiving unit 30 is defined as a phase difference φ.

$$\Delta t=(1/f)\times(\varphi/2\pi) \quad \text{Expression 5}$$

Here, the phase difference φ is expressed as follows.

$$\varphi=\mathrm{Arctan}((Q90-Q270)/(Q180-Q0)) \quad \text{Expression 6}$$

Therefore, the distance D from the irradiation unit 20 to the object OBJ is calculated as follows.

$$D=c\varphi/(4\pi f) \quad \text{Expression 7}$$

FIG. 7 is a block diagram illustrating an example of a configuration of a light intensity calculation unit of the distance measurement device according to an embodiment of the present technology. As illustrated in the drawing, the light intensity calculation unit 50 can include, for example, a received-light luminance profile generation unit 501, an averaging processing unit 502, an irradiation profile generation unit 504, and an irradiation-light intensity determination table 503.

The received-light luminance profile generation unit 501 calculates the light intensity in the target space on the basis of the pixel data read from the storage unit 40. In the present example, the light intensity calculation unit 50 calculates the luminance value of each pixel corresponding to the target space as the light intensity I using the above-described Expression 3. That is, the luminance value of each pixel constitutes a received-light luminance profile. The received-light luminance profile generation unit 501 outputs data of the generated received-light luminance profile to the averaging processing unit 502.

The averaging processing unit 502 performs averaging process on the received-light luminance profile on the basis of the received-light luminance profile generated by the received-light luminance profile generation unit 501. In the present example, the averaging processing unit 502 can calculate an average value of luminance values of a plurality of pixels forming a predetermined region as a luminance value of a pixel block, using the plurality of pixels as one pixel block. By the averaging process, it is possible to suppress a load of subsequent arithmetic process in the distance measurement device 1. The averaging processing unit 502 outputs the averaged data to the irradiation profile generation unit 504. The averaging processing unit 502 may use a luminance value of a specific pixel in the pixel block instead of the average value. Alternatively, the irradiation profile to be described later may be generated on the basis of the received-light luminance profile without performing the averaging process in the averaging processing unit 502.

For example, as illustrated in FIG. 8, the irradiation-light intensity determination table 503 is a table indicating the relationship between the luminance value of the target space and the irradiation intensity of the light. In this example, in the irradiation-light intensity determination table 503, the irradiation-light intensity is classified into four levels of "0 (none)", "3 (strong)", "2 (medium)", and "1 (weak)" according to the predetermined range of the average luminance value. That is, in a case where the average luminance value exceeds a predetermined threshold ("10" in this example), the irradiation-light intensity is determined to be higher as the average luminance value is lower (lower as the average luminance value is higher). For example, in a case where the average luminance value in a certain region is 0 to 10, "0" is selected as the irradiation-light intensity. Furthermore, in a case where the average luminance value is 10 to 63, "3" is selected as the irradiation-light intensity. Furthermore, in a case where the average luminance value is 64 to 127, "2" is selected as the irradiation-light intensity, and in a case where the average luminance value is 127 to 255, "1" is selected as the irradiation-light intensity. The irradiation-light intensity determination table 503 is referred to by the irradiation profile generation unit 504.

Returning to FIG. 7, the irradiation profile generation unit 504 can generate the irradiation profile by referring to the irradiation-light intensity determination table 503 on the basis of the received-light luminance profile subjected to the averaging process by the averaging processing unit 502. The irradiation profile indicates the intensity of the light emitted from the second light source 202 corresponding to each pixel in the distance measurement mode to the target space. The irradiation profile generation unit 504 processes a region having a high luminance value in the received-light luminance profile such that the light intensity decreases in the irradiation profile. Furthermore, the irradiation profile generation unit 504 processes a region having a low luminance value in the received-light luminance profile such that the light intensity increases in the irradiation profile. With this arrangement, the distance measurement device 1 can irradiate a region having a low luminance value in the target space with weak light intensity, and can irradiate a region having a high luminance value with strong light intensity. The irradiation profile generation unit 504 outputs data of the generated irradiation profile to a control signal generation unit (not illustrated) of the control unit 10. In the present disclosure, an example in which the irradiation profile is generated on the basis of the irradiation-light intensity determination table 503 is described, but the present disclosure is not limited thereto. For example, the irradiation profile may be generated by inverting the received-light luminance profile according to a predetermined rule.

Figure 9A:
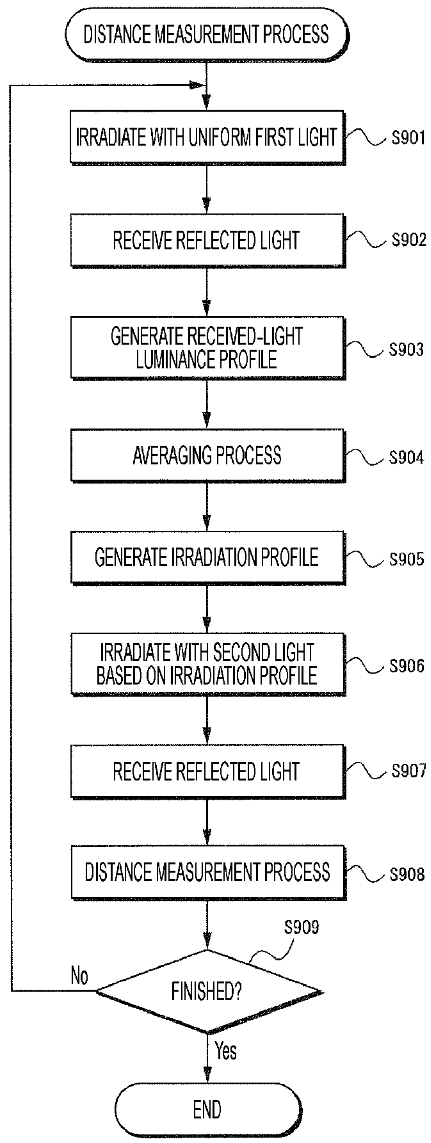
FIG. 9A is a flowchart for describing an example of an operation of the distance measurement device according to an embodiment of the present technology.

FIG. 9A is a flowchart for describing an example of an operation in the distance measurement process by the distance measurement device according to an embodiment of the present technology.

Figures 10A, 10B, 10C, 10D:
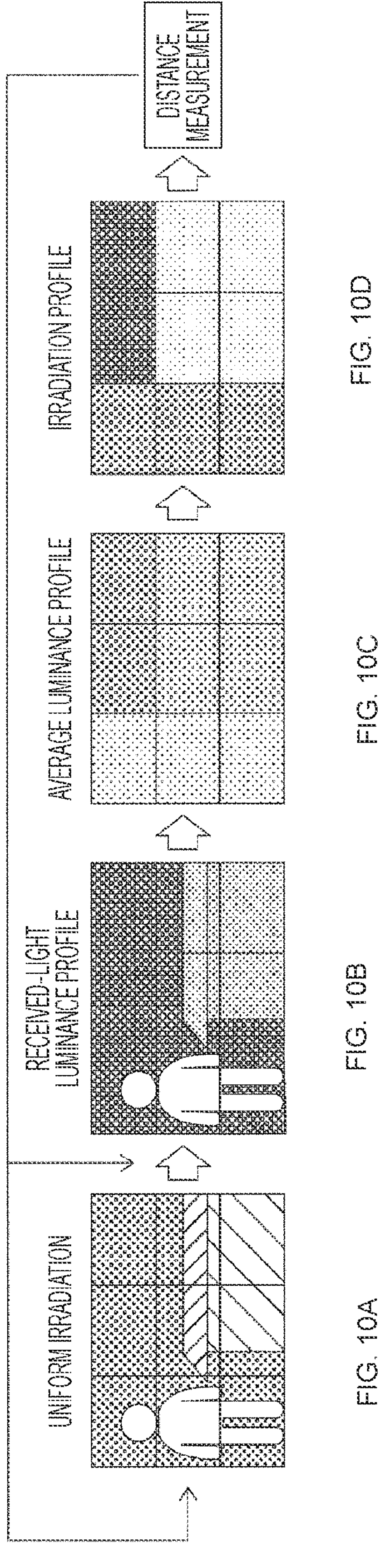
FIGS. 10A, 10B, 10C, and 10D are diagrams for describing an example of the operation of the distance measurement device according to an embodiment of the present technology.

As illustrated in the drawing, in the distance measurement device 1, the control unit 10 sets the emission mode to the profile generation mode and, with this arrangement, the irradiation unit 20 irradiates the target space with the first light having uniform spatial light intensity from the first light source 201 under the control of the control unit 10, for example, as illustrated in FIG. 10A (S901). In response to this operation, the light receiving unit 30 receives reflected light from the target object irradiated with the first light (S902), and outputs pixel data based on the reflected light. The pixel data output from the light receiving unit 30 is temporarily stored in the storage unit 40.

Next, the light intensity calculation unit 50 calculates a luminance value of each pixel corresponding to the target space and generates a received-light luminance profile (S903). As illustrated in FIG. 10B, the received-light luminance profile is a luminance value of each pixel for constituting an image frame. Subsequently, the light intensity calculation unit 50 performs the averaging process on the basis of the received-light luminance profile, and generates an average received-light luminance profile as illustrated in FIG. 10C, for example (S904). The average received-light luminance profile is an average value of luminance values of a pixel group in each predetermined region obtained by dividing an image frame. That is, in the example of the average received-light luminance profile illustrated in FIG. 10C of the same drawing, it is indicated that the average luminance values for the respective predetermined regions are calculated such that the average luminance values of the three regions at the left end including the human-like features are the highest, followed by the four regions including the building-like features and the two regions above the building-like features.

Next, the light intensity calculation unit 50 generates an irradiation profile as illustrated in FIG. 10D according to the average received-light luminance profile (S905). As described above, the irradiation profile is a profile in which a region having a higher average luminance value indicates a weaker light intensity value and a region having a lower average luminance value indicates a stronger light intensity value among regions where the average luminance value exceeds a predetermined threshold in the average received-light luminance profile. That is, the example of the irradiation profile illustrated in FIG. 10D of the same drawing indicates that the light intensities of the left three regions including the human-like feature are lower than the light intensities of the four regions including the building-like feature. Note that, regarding the two regions above the building-like feature, the light intensity is set to “0” because the average luminance value does not exceed the predetermined threshold.

In a case where the irradiation profile is generated, the control unit 10 switches the emission mode to the distance measurement mode and, with this arrangement, the irradiation unit 20 performs irradiation with the second light according to the irradiation profile from the second light source 202 under the control of the control unit 10 (S906). That is, the distance measurement device 1 irradiates the region having the high luminance value with the weak light intensity, and irradiates the region having the low luminance value with the strong light intensity in the received-light luminance profile. Note that the second light source 202 of the irradiation unit 20 may emit spot-shaped second light to a detailed region according to the generated irradiation profile. In response to this operation, the light receiving unit 30 receives the reflected light from the target object irradiated with the second light (S907), and outputs the pixel data based on the reflected light. The pixel data output from the light receiving unit 30 is temporarily stored in the storage unit 40.

Subsequently, the distance measurement processing unit 60 performs the distance measurement process on the basis of the pixel data stored in the storage unit 40 (S908). As described above, the distance measurement processing unit 60 calculates the distance from the irradiation unit 20 to the object OBJ according to Expression 7.

The control unit 10 determines whether or not the distance measuring process has finished (S909). In a case where determining that the distance measuring process has finished (Yes in S909), the control unit 10 ends the distance measuring process. Furthermore, in a case where determining that the distance measuring process is not finished (No in S909), the distance measurement device 1 returns to the process of S901.

As described above, the distance measurement device 1 can irradiate the region having a high luminance value in the target space with a weak light intensity, and irradiate the region having a low luminance value with a strong light intensity. With this arrangement, the distance measurement device 1 can safely measure a distance to the target object OBJ having a high luminance value, for example, located at a short distance. In addition, the distance measurement device 1 can measure a distance to the target object OBJ having a low luminance value, for example, positioned at a long distance without lowering the distance measurement accuracy.

Figure 9B:
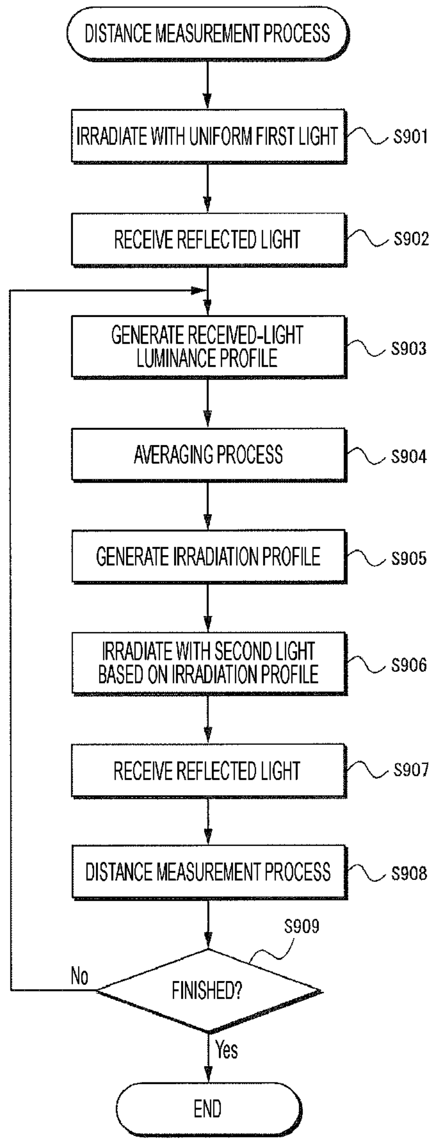
FIG. 9B is a flowchart for describing an example of the operation of the distance measurement device according to an embodiment of the present technology.

Note that, as in the example illustrated in FIG. 9B, the first light having a uniform spatial light intensity is not always emitted before the distance measurement process based on the second light. For example, as illustrated in FIG. 9B, after the first light is emitted once to create the irradiation profile, the distance measurement process may be performed a plurality of times with the second light according to the irradiation profile. With this arrangement, it is possible to omit the process of, by the first light source 201, emitting the first light and the process of, by the light receiving unit 30, receiving the reflected light from the target object irradiated with the first light, and it is possible to perform the distance measurement process more efficiently.

Second Embodiment

The present embodiment relates to a modification of the distance measurement process of the distance measurement device 1. In the first embodiment, the irradiation unit 20 is configured to emit first light having a uniform spatial light intensity from the first light source and emit second light having a spatial light intensity according to an irradiation profile from the second light source. On the other hand, in the present embodiment, the irradiation unit 20 is configured to emit both the first light and the second light from the first light source 201.

FIG. 2B is a diagram illustrating an example of a configuration of the irradiation unit of the distance measurement device according to an embodiment of the present technology. The irradiation unit 20 of the present embodiment is different from the irradiation unit 20 illustrated in FIG. 2A in that the second light source 202 is not included and only the first light source 201 is included. In the drawing, the same components as those illustrated in FIG. 2A are denoted by the same reference numerals.

In the present embodiment, the irradiation unit 20 emits first light having uniform spatial light intensity from the first light source 201, in a profile generation mode for generating a received-light luminance profile indicating light intensity for each region of the target space, and emits second light having spatial light intensity according to the irradiation profile from the first light source, in a distance measurement mode for measuring the distance to the target object OBJ. Since both the first light and the second light are emitted from the first light source, the first light and the second light have the same wavelength. The first light and the second light are, for example, near-infrared light in a wavelength range of about 800 to 1000 nm. In the present disclosure, the wavelengths of the first light and the second light are assumed to be about 940 nm.

In addition, an example of an operation of the distance measurement process by the distance measurement device according to the present embodiment will be described with reference to FIG. 9A. As illustrated in the drawing, in the distance measurement device 1, the control unit 10 sets the emission mode to the profile generation mode and, with this arrangement, the irradiation unit 20 irradiates the target space with the first light having uniform spatial light intensity from the first light source 201 under the control of the control unit 10 (S901). In response to this operation, the light receiving unit 30 receives reflected light from the target object irradiated with the first light (S902), and outputs pixel data based on the reflected light. The pixel data output from the light receiving unit 30 is temporarily stored in the storage unit 40.

Next, the light intensity calculation unit 50 calculates a luminance value of each pixel corresponding to the target space and generates a received-light luminance profile (S903). The received-light luminance profile is a luminance value of each pixel for constituting an image frame. Subsequently, the light intensity calculation unit 50 performs the averaging process on the basis of the received-light luminance profile to generate an average received-light luminance profile (S904).

Next, the light intensity calculation unit 50 generates an irradiation profile according to the average received-light luminance profile (S905). In a case where the irradiation profile is generated, the control unit 10 switches the emission mode to the distance measurement mode. Here, in the present embodiment, the irradiation unit 20 performs irradiation with the second light according to the irradiation profile from the first light source 201 under the control of the control unit 10 (S906). That is, in the present embodiment, using the first light source 201, the distance measurement device 1 irradiates a region having a high luminance value with weak light intensity, and irradiates a region having a low luminance value with strong light intensity, in the received-light luminance profile. Note that the first light source 201 of the irradiation unit 20 may emit spot-shaped second light to a detailed region according to the generated irradiation profile. In response to this operation, the light receiving unit 30 receives the reflected light from the target object irradiated with the second light (S907), and outputs the pixel data based on the reflected light. The pixel data output from the light receiving unit 30 is temporarily stored in the storage unit 40.

Subsequently, the distance measurement processing unit 60 performs the distance measurement process on the basis of the pixel data stored in the storage unit 40 (S908). As described above, the distance measurement processing unit 60 calculates the distance from the irradiation unit 20 to the object OBJ according to Expression 7.

The control unit 10 determines whether or not the distance measuring process has finished (S909). In a case where determining that the distance measuring process has finished (Yes in S909), the control unit 10 ends the distance measuring process. Furthermore, in a case where determining that the distance measuring process is not finished (No in S909), the distance measurement device 1 returns to the process of S901.

As described above, the distance measurement device 1 of the present embodiment can irradiate, using only one light source, a region having a high luminance value with weak light intensity and a region having a low luminance value with strong light intensity, in the target space. With this arrangement, the distance measurement device 1 can safely measure a distance to the target object OBJ having a high luminance value, for example, located at a short distance while reducing the cost. In addition, the distance measurement device 1 can measure a distance to the target object OBJ having a low luminance value, for example, positioned at a long distance without lowering the distance measurement accuracy.

Note that, as in the example illustrated in FIG. 9B, the first light having a uniform spatial light intensity is not always emitted before the distance measurement process based on the second light. For example, as illustrated in FIG. 9B, after the first light is emitted once to create the irradiation profile, the distance measurement process may be performed a plurality of times with the second light according to the irradiation profile. As a result, it is possible to omit the process of emitting the first light and the process of receiving the reflected light from the target object irradiated with the first light by the light receiving unit 30, and it is possible to more efficiently perform the distance measurement process.

Third Embodiment

The present embodiment relates to a modification of the distance measurement process of the distance measurement device 1. In the first embodiment, the distance measurement device 1 is configured to generate the received-light luminance profile and the irradiation profile of the fixed target object OBJ and emit the second light on the basis of the irradiation profile, but in the present embodiment, the distance measurement device 1 is configured to predict an optimum irradiation profile for the target space including a dynamic target object OBJ and emit second light according to a predicted irradiation profile.

FIG. 11 is a block diagram illustrating an example of another configuration of a light intensity calculation unit of the distance measurement device according to an embodiment of the present technology. The light intensity calculation unit 50' of the present embodiment is different from the light intensity calculation unit 50 illustrated in FIG. 7 in that it is configured to include a received-light luminance profile storing unit 511 and a predicted received-light luminance profile generation unit 512. In the drawing, the same components as those illustrated in FIG. 7 are denoted by the same reference numerals, and the detailed description thereof will be omitted below.

Referring to the drawing, the received-light luminance profile generation unit 501 generates the light reception luminance profile on the basis of the luminance value of each pixel corresponding to the target space based on the pixel data read from the storage unit 40 as described above. The generated received-light luminance profile is output to the received-light luminance profile storing unit 511 and also output to the predicted received-light luminance profile generation unit 512.

The received-light luminance profile storing unit 511 temporarily stores the received light luminance profile generated by the received-light luminance profile generation unit 501. The temporarily stored received-light luminance profile is read by the predicted received-light luminance profile generation unit 512, for example, at the timing of the next image frame.

The predicted received-light luminance profile generation unit 512 generates a predicted received-light luminance profile on the basis of the current and past received-light luminance profiles. Specifically, the predicted received-light luminance profile generation unit 512 generates the predicted received-light luminance profile corresponding to the next image frame on the basis of the received-light luminance profile corresponding to the current image frame output from the received-light luminance profile generation unit 501 and the received-light luminance profile corresponding to the past image frame temporarily stored in the received-light luminance profile storing unit 511. That is, with respect to the target object OBJ recognized by a group of certain luminance values in the received-light luminance profile, the predicted received-light luminance profile generation unit 512 predicts movement of the target object OBJ by specifying the positional change with respect to the temporal change, and generates the predicted received-light luminance profile.

The averaging processing unit 502 performs an averaging process on the predicted received-light luminance profile predicted and generated by the predicted received-light luminance profile generation unit 512. The irradiation profile generation unit 504 refers to the irradiation-light intensity determination table 503 and generates an irradiation profile on the basis of the averaged predicted received-light luminance profile. That is, in the present example, the irradiation profile output from the irradiation profile generation unit 504 is the predicted irradiation profile for the target space. With this arrangement, the second light source 202 of the irradiation unit 20 emits the second light according to the irradiation profile under the control of the control unit 10.

Note that, in the present example, the light intensity calculation unit 50' is configured to generate the predicted received-light luminance profile and then perform the averaging process on the predicted received-light luminance profile, but the present invention is not limited thereto. For example, the light intensity calculation unit 50' may be configured to temporarily store an average received-light luminance profile obtained by averaging received-light luminance profiles, and generate a predicted received-light luminance profile on the basis of current and past average received-light luminance profiles. In this case, the size of each predetermined region is appropriately set so that the target object OBJ can be recognized.

Figure 13:
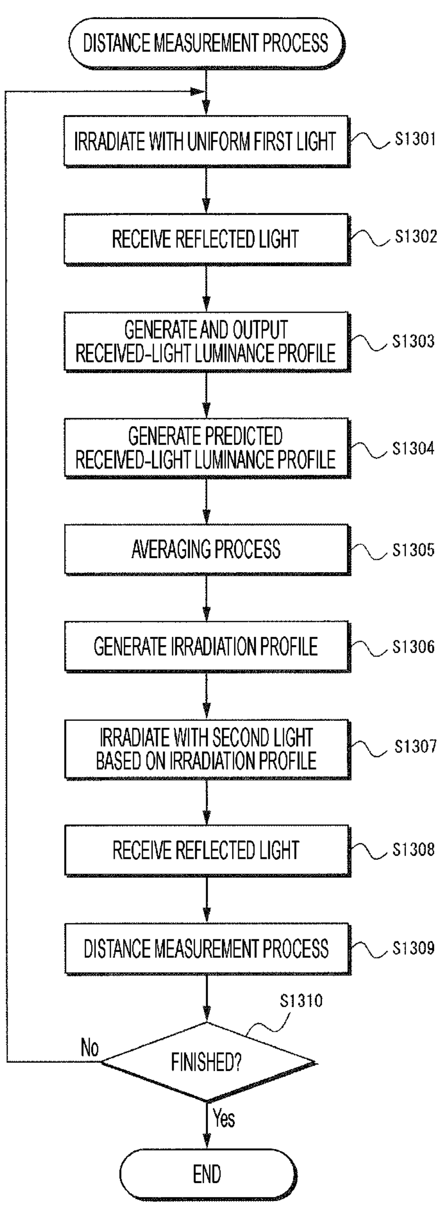
FIG. 13 is a flowchart for describing an example of the operation of the distance measurement device according to an embodiment of the present technology.

FIG. 13 is a flowchart for describing an example of the distance measurement process including moving object prediction according to an embodiment of the present technology.

As illustrated in the drawing, in the distance measurement device 1, the control unit 10 sets the emission mode to the profile generation mode and, with this arrangement, the irradiation unit 20 irradiates the target space with the first light having uniform spatial light intensity from the first light source 201 under the control of the control unit 10 (S1301). In response to this operation, the light receiving unit 30 receives the reflected light from the target object irradiated with the first light (S1302), and outputs the pixel data based on the reflected light. The pixel data output from the light receiving unit 30 is temporarily stored in the storage unit 40.

Figures 12A, 12B, 12C, 12D, 12E, 12F:
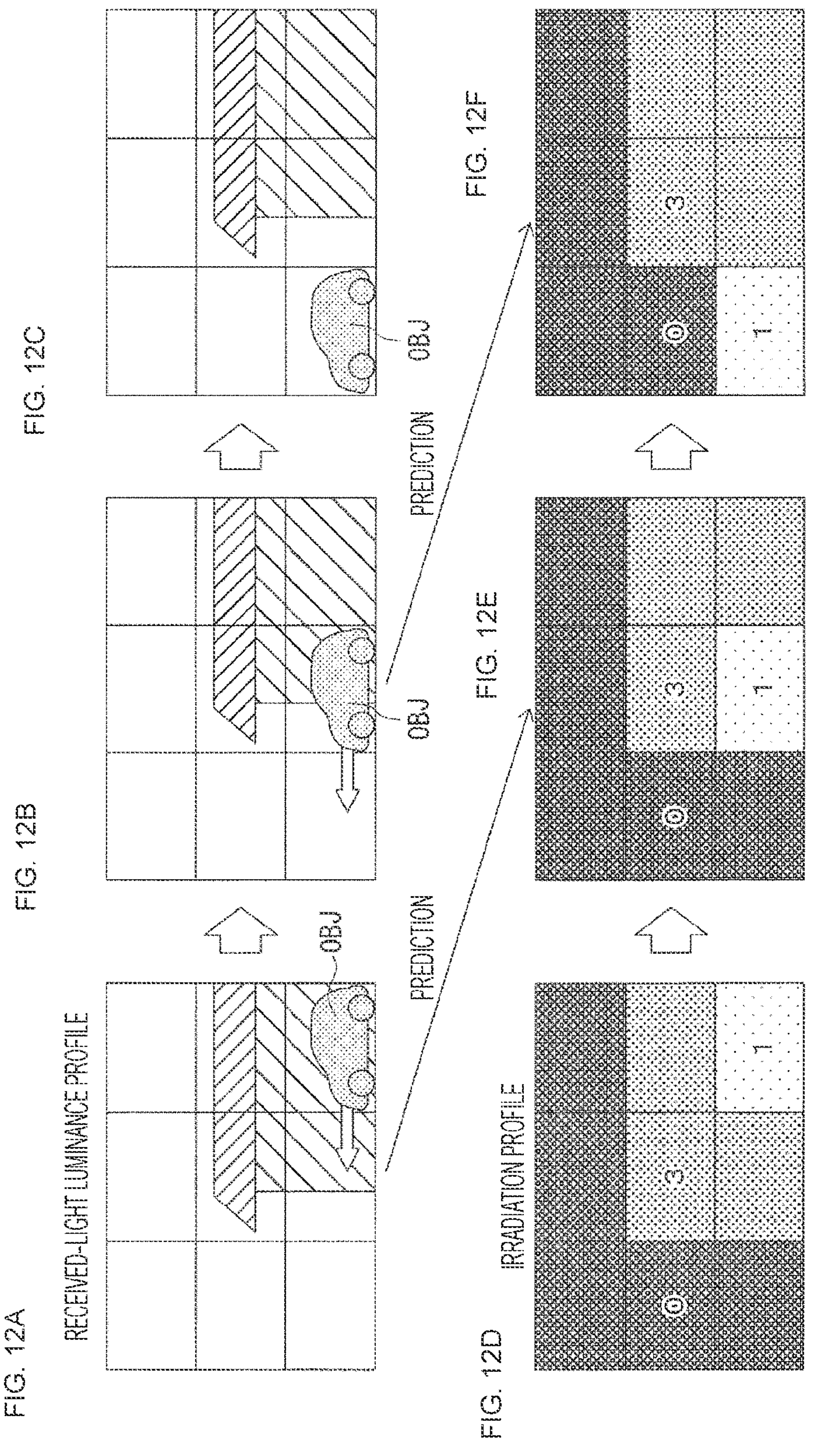
FIGS. 12A, 12B, 12C, 12D, 12E, and 12F are diagrams for describing the operation of a predicted received-light luminance profile generation unit of the distance measurement device according to an embodiment of the present technology.

Next, the light intensity calculation unit 50' calculates a luminance value of each pixel corresponding to the target space and generates a received-light luminance profile (S1303). As illustrated in FIG. 12B, the received-light luminance profile is a luminance value of each pixel constituting an image frame. The generated received-light luminance profile is output to the received-light luminance profile storing unit 511 and temporarily stored, and is output to the predicted received-light luminance profile generation unit 512.

Next, the light intensity calculation unit 50' generates a predicted received-light luminance profile according to the current and past received-light luminance profiles (S1304). Specifically, for example, the light intensity calculation unit 50' generates the predicted received-light luminance profile as illustrated in FIG. 12C corresponding to the next image frame on the basis of the received-light luminance profile as illustrated in FIG. 12B corresponding to the current image frame and the received-light luminance profile as illustrated in FIG. 12A corresponding to the past image frame temporarily stored in the received-light luminance profile storing unit 511 in the predicted received-light luminance profile generation unit 512.

Subsequently, the light intensity calculation unit 50' performs the averaging process on the basis of the predicted received-light luminance profile to generate an average received-light luminance profile (S1305).

Next, the light intensity calculation unit 50' generates an irradiation profile as illustrated in FIG. 12E according to the generated average received-light luminance profile (S1306). As described above, the irradiation profile is a profile in which a region having a higher average luminance value indicates a weaker light intensity value and a region having a lower average luminance value indicates a stronger light intensity value among regions where the average luminance value exceeds a predetermined threshold in the average received-light luminance profile.

In a case where the irradiation profile is generated, the control unit 10 switches the emission mode to the distance measurement mode and, with this arrangement, the irradiation unit 20 performs irradiation with the second light according to the irradiation profile from the second light source 202 under the control of the control unit 10 (S1307). That is, the distance measurement device 1 irradiates the region having the high luminance value with the weak light intensity, and irradiates the region having the low luminance value with the strong light intensity in the received-light luminance profile. Note that the second light source 202 of the irradiation unit 20 may emit spot-shaped second light to a detailed region according to the generated irradiation profile. In response to this operation, the light receiving unit 30 receives the reflected light from the target object irradiated with the second light (S1308), and outputs the pixel data based on the reflected light. The pixel data output from the light receiving unit 30 is temporarily stored in the storage unit 40.

Subsequently, the distance measurement processing unit 60 performs the distance measurement process on the basis of the pixel data stored in the storage unit 40 (S1309). As described above, the distance measurement processing unit 60 calculates the distance from the irradiation unit 20 to the object OBJ according to Expression 7.

The control unit 10 determines whether or not the distance measuring process has finished (S1310). In a case where determining that the distance measuring process has finished (Yes in S1310), the control unit 10 ends the distance measuring process. In addition, in a case where determining that the distance measuring process is not finished (No in S1310), the distance measurement device 1 returns to the process of S1301.

Note that, the first light having a uniform spatial light intensity is not always emitted before the distance measurement process based on the second light. For example, after the first light is emitted once to create the irradiation profile, the distance measurement process may be performed a plurality of times with the second light according to the irradiation profile. With this arrangement, it is possible to omit the process of, by the first light source 201, emitting the first light and the process of, by the light receiving unit 30, receiving the reflected light from the target object irradiated with the first light, and it is possible to perform the distance measurement process more efficiently.

According to the present embodiment, it is possible to predict an optimum irradiation profile not only for a fixed target object OBJ but also for a target space including a dynamic target object OBJ, and to perform irradiation with the second light according to the predicted irradiation profile to perform distance measurement.

Each of the above embodiments is an example for describing the present technology, and is not intended to limit the present technology only to these embodiments. The present technology can be implemented in various forms without departing from the gist thereof.

For example, in the methods disclosed herein, steps, operations, or functions may be performed in parallel or in a different order as long as there is no inconsistency in the results. The described steps, operations, and functions are provided merely as examples. Besides, without departing from the gist of the invention, some of the steps, operations, and functions may be omitted or be combined with each other to form one, or other steps, operations, or functions may be added.

In addition, although various embodiments are disclosed herein, certain features (technical matters) in one embodiment can be added to or replaced with certain features in another embodiment while being appropriately improved, and such forms are also included in the gist of the present technology.

Furthermore, the present technology may be configured to include the following technical matters.

(1)

A distance measurement device, including:

an irradiation unit configured to emit light to a target space;

a light receiving unit configured to receive observation light in the target space and including a plurality of light receiving elements that outputs an electric signal;

a light intensity calculation unit configured to calculate light intensity in the target space, on the basis of a first electric signal corresponding to reflected light from an object irradiated with first light included in the observation light received by the light receiving unit, the first light being emitted from the irradiation unit; and a distance measurement processing unit configured to perform a distance measurement process for calculating a distance to the object, on the basis of a second electric signal corresponding to reflected light from the object irradiated with second light included in the observation light received by the light receiving unit, the second light being emitted from the irradiation unit on the basis of the light intensity calculated by the light intensity calculation unit.

(2)

The distance measurement device according to above (1), in which the first light emitted from the irradiation unit is light having a uniform spatial light intensity toward the target space.

(3)

The distance measurement device according to above (1) or (2), in which the first light is an infrared ray.

(4)

The distance measurement device according to above (1) to (3), in which a wavelength of the second light is shorter than a wavelength of the first light.

(5)

The distance measurement device according to above (1), in which the light intensity calculation unit calculates a luminance value, as the light intensity, on the basis of the first electric signal.

(6)

The distance measurement device according to above (1) or (5), in which the light intensity calculation unit generates a received-light luminance profile of the target space, on the basis of the first electric signal.

(7)

The distance measurement device according to above (5) or (6), in which the light intensity calculation unit generates an irradiation profile regarding a spatial light intensity of the second light in the target space, on the basis of the generated received-light luminance profile, and the irradiation unit emits the second light according to the generated irradiation profile.

(8)

The distance measurement device according to above (5) to (7), in which the light intensity calculation unit calculates the light intensity in the irradiation profile such that the light intensity of the second light decreases in a region with higher light intensity in the received-light luminance profile.

(9)

The distance measurement device according to above (5) to (7), in which the light intensity calculation unit calculates the light intensity in the irradiation profile such that the light intensity of the second light increases in a region with lower light intensity in the received-light luminance profile.

(10)

The distance measurement device according to above (5) to (7), in which the light intensity calculation unit calculates an average value of the light intensity for each region in the received-light luminance profile, and generates the irradiation profile on the basis of the average value.

(11)

The distance measurement device according to above (5) to (10), in which the light intensity calculation unit sets the light intensity in the irradiation profile to a predetermined value so as not to irradiate the second light to a region where the calculated average value does not exceed a predetermined threshold.

(12)

The distance measurement device according to above (5) to (11), in which the light intensity calculation unit calculates the light intensity toward the object in the target space on the basis of the received-light luminance profile.

(13)

The distance measurement device according to above (2) or (9), in which the irradiation unit emits the second light in a spot shape according to the calculated light intensity for the object.

(14)

The distance measurement device according to above (1) or (5) to (12), in which the calculation of the light intensity by the light intensity calculation unit and the distance measurement process by the distance measurement processing unit are alternately repeated.

(15)

The distance measurement device according to above (1) or (5) to (12), in which the light intensity calculation unit predicts movement of an object irradiated with the first light and calculates light intensity toward the target space.

(16)

A distance measurement method, including:

emitting light from an irradiation unit to a target space;

receiving observation light of the target space and outputting an electric signal by a light receiving unit;

calculating light intensity in the target space on the basis of a first electric signal corresponding to reflected light from an object irradiated with first light included in observation light received by the light receiving unit, the first light being emitted from the irradiation unit; and performing a distance measurement process for calculating a distance to the object, on the basis of a second electric signal corresponding to reflected light from the object irradiated with second light included in observation light received by the light receiving unit, the second light being emitted from the irradiation unit on the basis of the calculated light intensity.

REFERENCE SIGNS LIST

1 Distance measurement device
10 Control unit
20 Irradiation unit
201 First light source

201*a* First light emitting element
202 Second light source
202*a* Second light emitting element
30 Light receiving unit
32 Pixel array unit
33 Vertical driving unit
332 Read scanning circuit
334 Sweep scanning circuit
34 Horizontal driving unit
35 Column processing unit
40 Storage unit
50 Light intensity calculation unit
501 Received-light luminance profile generation unit
502 Averaging processing unit
503 Irradiation-light intensity determination table
504 Irradiation profile generation unit
511 Received-light luminance profile storing unit
512 Predicted received-light luminance profile generation unit
60 Distance measurement processing unit
70 Communication IF unit

The invention claimed is:

1. A distance measurement device, comprising:

an irradiation unit configured to emit light on an object in a target space, wherein the emitted light comprises first light and second light;

a light receiving unit configured to receive observation light in the target space, wherein the light receiving unit comprises a plurality of light receiving elements configured to output a plurality of electric signals;

a light intensity calculation unit configured to calculate light intensity in the target space, based on a first electric signal of the plurality of electric signals, wherein the first electric signal corresponds to first reflected light from the object irradiated with the first light, the first reflected light is included in the observation light received by the light receiving unit, and the second light is emitted based on the calculated light intensity; and a distance measurement processing unit configured to execute a distance measurement process to calculate a distance to the object, based on a second electric signal of the plurality of electric signals, wherein the second electric signal corresponds to second reflected light from the object irradiated with the second light, and the second reflected light is included in the observation light received by the light receiving unit.

2. The distance measurement device according to claim 1, wherein the first light emitted from the irradiation unit is light comprising a uniform spatial light intensity toward the target space.

3. The distance measurement device according to claim 2, wherein the first light is an infrared ray.

4. The distance measurement device according to claim 3, wherein a wavelength of the second light is shorter than a wavelength of the first light.

5. The distance measurement device according to claim 1, wherein the light intensity calculation unit is further configured to calculate a luminance value, as the light intensity, based on the first electric signal.

6. The distance measurement device according to claim 1, wherein the light intensity calculation unit is further configured to generate a received-light luminance profile of the target space, based on the first electric signal.

7. The distance measurement device according to claim 6, wherein the light intensity calculation unit is further configured to generate an irradiation profile regarding a spatial light intensity of the second light in the target space, based on the generated received-light luminance profile, and the irradiation unit is further configured to emit the second light based on the generated irradiation profile.

8. The distance measurement device according to claim 7, wherein the light intensity calculation unit is further configured to calculate the light intensity in the irradiation profile such that the light intensity of the second light decreases in a region with higher light intensity in the received-light luminance profile.

9. The distance measurement device according to claim 7, wherein the light intensity calculation unit is further configured to calculate the light intensity in the irradiation profile such that the light intensity of the second light increases in a region with lower light intensity in the received-light luminance profile.

10. The distance measurement device according to claim 7, wherein the light intensity calculation unit is further configured to:

calculate an average value of the light intensity for each region in the received-light luminance profile, and generate the irradiation profile based on the average value.

11. The distance measurement device according to claim 10, wherein the light intensity calculation unit is further configured to set the light intensity in the irradiation profile to a specific value so as not to irradiate the second light to a region where the calculated average value does not exceed a specific threshold.

12. The distance measurement device according to claim 7, wherein the light intensity calculation unit is further configured to calculate the light intensity toward the object in the target space based on the received-light luminance profile.

13. The distance measurement device according to claim 9, wherein the irradiation unit is further configured to emit the second light in a spot shape based on the calculated light intensity for the object.

14. The distance measurement device according to claim 1, wherein the calculation of the light intensity by the light intensity calculation unit and the distance measurement process by the distance measurement processing unit are alternately repeated.

15. The distance measurement device according to claim 1, wherein the light intensity calculation unit is further configured to:

predict a movement of the object irradiated with the first light; and calculate the light intensity toward the target space.

16. A distance measurement method, comprising:

emitting, from an irradiation unit, light on an object in a target space, wherein the emitted light comprises first light and second light;

receiving, by a light receiving unit, observation light in the target space and outputting a plurality of electric signals;

calculating, by a light intensity calculation unit, light intensity in the target space based on a first electric signal, of the plurality of electric signals, wherein the first electric signal corresponds to first reflected light from the object irradiated with the first light, and the first reflected light is included in the observation light received by the light receiving unit;

emitting, from the irradiation unit, the second light based on the calculated light intensity; and executing, by a distance measurement processing unit, a distance measurement process for calculating a distance to the object, based on a second electric signal of the plurality of electric signals, wherein the second electric signal corresponds to second reflected light from the object irradiated with the second light, and the second reflected light is included in the observation light received by the light receiving unit.

17. The distance measurement device according to claim 1, wherein the light receiving unit includes a plurality of pixels, and each pixel includes a pair of gates configured to:

transfer charges QA and QB, and output the first electric signal and the second electric signal based on a charge amount Q=QA−QB.

* * * * *